(12) United States Patent
Yamamoto (10) Patent No.: US 12,162,320 B1
(45) Date of Patent: Dec. 10, 2024

(54) OFF-ROAD VEHICLE

(71) Applicant: KAWASAKI MOTORS, LTD., Hyogo (JP)

(72) Inventor: Teruaki Yamamoto, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 18/508,325

(22) Filed: Nov. 14, 2023

(51) Int. Cl.
*B60G 13/00* (2006.01)
*B60R 19/00* (2006.01)
*B62D 25/16* (2006.01)
*B62D 25/18* (2006.01)
*B60R 21/00* (2006.01)

(52) U.S. Cl.
CPC ............ *B60G 13/005* (2013.01); *B60R 19/00* (2013.01); *B62D 25/168* (2013.01); *B62D 25/18* (2013.01); *B60R 2019/002* (2013.01); *B60R 2021/0074* (2013.01); *B60Y 2200/20* (2013.01); *B60Y 2410/114* (2013.01)

(58) Field of Classification Search
CPC .... B60G 13/005; B60G 13/00; B62D 25/168; B62D 25/16; B62D 25/08; B62D 25/188; B62D 25/18; B60R 13/0861; B60R 19/00; B60R 2019/002; B60R 2021/0074; B60Y 2200/20; B60Y 2200/124; B60Y 2410/114
USPC ................... 296/198; 280/124.11, 851, 847; D12/184, 185
See application file for complete search history.

(56) References Cited

U.S. PATENT DOCUMENTS

| | | | | |
|---|---|---|---|---|
| 5,275,436 A | * | 1/1994 | Pomero | B62D 25/08 296/187.03 |
| 8,585,088 B1 | * | 11/2013 | Kaku | B62D 21/183 280/848 |
| 9,150,182 B1 | * | 10/2015 | Schlangen | B60G 3/20 |
| 9,440,527 B1 | * | 9/2016 | Maeda | B60K 11/04 |
| 9,731,672 B1 | | 8/2017 | Kosuge et al. | |
| 10,196,094 B2 | * | 2/2019 | Tsumiyama | B62D 23/005 |
| 10,518,826 B2 | * | 12/2019 | Bednarchik | B62D 25/161 |
| 11,260,746 B2 | * | 3/2022 | Denis | B60K 15/00 |
| 11,608,116 B2 | * | 3/2023 | Yotsuyanagi | B62D 21/157 |
| 2008/0048469 A1 | * | 2/2008 | Kosuge | B62D 25/20 296/181.1 |
| 2011/0133518 A1 | * | 6/2011 | Wanke | B62D 25/2018 296/203.02 |
| 2015/0008703 A1 | * | 1/2015 | Furusaki | B62D 25/025 296/187.08 |
| 2016/0288747 A1 | * | 10/2016 | Jensen | B60R 13/0861 |
| 2019/0256149 A1 | * | 8/2019 | Peru | B62D 21/152 |
| 2020/0198554 A1 | * | 6/2020 | Nakamura | B60R 13/07 |
| 2020/0353995 A1 | * | 11/2020 | Alwan | B62D 25/04 |
| 2021/0237802 A1 | * | 8/2021 | Chalifour | B62D 23/005 |

\* cited by examiner

*Primary Examiner* — Keith J Frisby
(74) *Attorney, Agent, or Firm* — Studebaker & Brackett PC (57) ABSTRACT

A utility vehicle 100 includes a vehicle body frame 1 and a guard panel 20, 220 attached to the vehicle body frame 1 and defining a front portion of a vehicle body 2. The guard panel 20, 220 includes a recessed wall 21 defining a wheel housing 4 that houses a front wheel 3 and an upper wall 25 located above the recessed wall 21, and the upper wall 25 includes a first inclined wall 26 inclined with respect to a vehicle width direction so as to be positioned on the outer side in the vehicle width direction as extending rearward.

7 Claims, 8 Drawing Sheets

OFF-ROAD VEHICLE

FIELD

The technique disclosed here relates to an off-road vehicle.

BACKGROUND

U.S. Pat. No. 9,731,672 discloses an off-road vehicle including a cabin front wall defining the front end of a vehicle interior. The cabin front wall includes a cabin front wall body that separates the vehicle interior and a bonnet chamber from each other. The cabin front wall body has a double wall structure.

SUMMARY

An obstacle such as a tree or a tree branch may be dropped on a target traveling path of the off-road vehicle. There is a probability that during traveling, such an obstacle may contact a vehicle body front portion. For the off-road vehicle, entrance of the obstacle into the vehicle interior needs to be prevented.

The technique disclosed here has been made in view of the above-described points, and an object thereof is to prevent an obstacle in front of a vehicle from entering a vehicle interior.

An off-road vehicle disclosed here includes a vehicle body frame and a guard panel attached to the vehicle body frame and defining a front portion of a vehicle body. The guard panel includes a recessed wall defining a wheel housing that houses a front wheel and an upper wall located above the recessed wall, and the upper wall includes a first inclined wall inclined with respect to a vehicle width direction so as to be positioned on the outer side in the vehicle width direction as extending rearward.

The off-road vehicle can prevent the obstacle in front of the vehicle from entering the vehicle interior.

DESCRIPTION OF EMBODIMENTS

Figure 1:
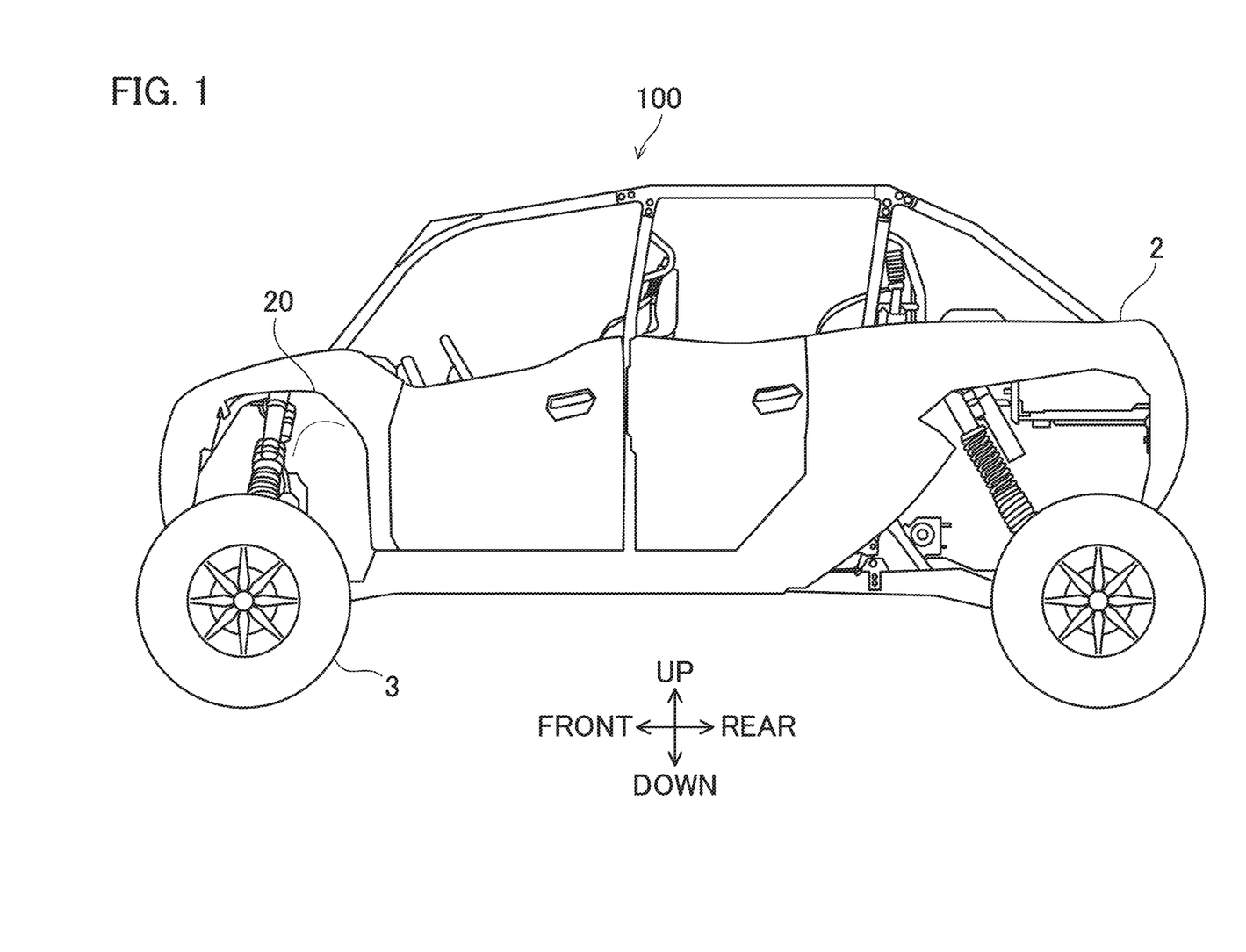
FIG. 1 is a side view of a utility vehicle.

Hereinafter, an exemplary embodiment will be described based on the drawings. FIG. 1 is a side view of a utility vehicle 100.

The utility vehicle 100 is a four-wheeled vehicle that can travel off road. The utility vehicle 100 is one example of an off-road vehicle. Hereinafter, the utility vehicle 100 will also be merely referred to as a "vehicle 100." The vehicle 100 includes a vehicle body 2.

In the present disclosure, each component of the vehicle 100 will be described using a direction with respect to the vehicle 100. Specifically, a "front" means the front of the vehicle 100 in a vehicle front-rear direction, and a "rear" means the rear of the vehicle 100 in the vehicle front-rear direction. A "left" means the left when facing the front of the vehicle 100, and a "right" means the right when facing the front of the vehicle 100. Note that a right-left direction will also be referred to as a "vehicle width direction." In the present disclosure, a member extending or expanding in a certain direction includes not only a member precisely extending or expanding parallel with a certain direction, but also a member substantially extending or expanding in a certain direction.

Figure 2:
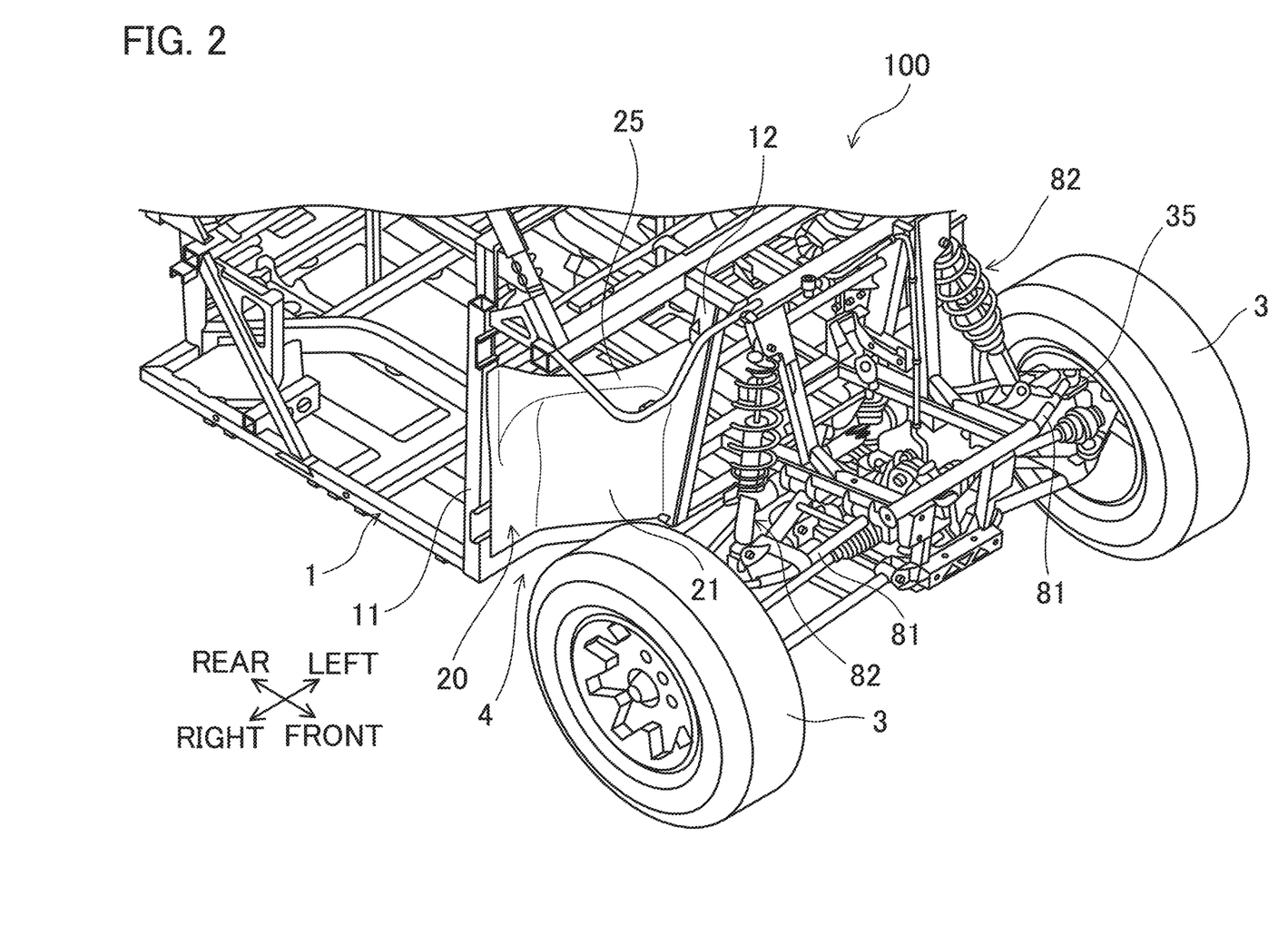
FIG. 2 is a perspective view showing the partially-disassembled utility vehicle diagonally from the front right.

FIG. 2 is a perspective view showing the partially-disassembled vehicle 100 diagonally from the front right. In FIG. 2, an exterior member such as a door is not shown for the sake of convenience in description. The vehicle 100 includes a vehicle body frame 1 and a guard panel 20 attached to the vehicle body frame 1 and defining a front portion of the vehicle body 2 (see FIG. 1). The vehicle 100 may further include a suspension arm 81 coupling the vehicle body frame 1 and a front wheel 3 to each other and a shock absorber 82 located above the suspension arm 81 and attached to the suspension arm 81. In this example, the suspension arm 81 is a so-called A arm. The vehicle 100 includes right and left front wheels 3, right and left suspension arms 81, and right and left shock absorbers 82.

The vehicle body frame 1 is a frame group which is a framework of the vehicle body 2 of the vehicle 100. Each frame of the vehicle body frame 1 is, for example, a metal pipe. The vehicle body frame 1 includes a first frame 11 and a second frame 12 that support the guard panel 20.

The first frame 11 is located at a front corner portion of a vehicle interior on the outer side in the vehicle width direction. The first frame 11 is located at rear of the front wheel 3. The first frame 11 extends in an up-down direction. The first frame 11 includes a pair of first frames 11 located right and left. The second frame 12 is located at a front portion of the vehicle interior slightly on the outer side in the vehicle width direction with respect to the center in the vehicle width direction. The second frame 12 extends in the up-down direction. In this example, the second frame 12 extends in the up-down direction such that in terms of a position in the front-rear direction, the upper end thereof is positioned at front with respect to the lower end. The second frame 12 includes a pair of second frames 12 located right and left.

The guard panel 20 prevents an obstacle (hereinafter merely referred to as an "obstacle") coming from the front of the vehicle, such as a tree or a tree branch, from entering the vehicle interior. At a front portion of the vehicle body of the vehicle 100, members such as a bonnet, a front grill, and a front mask are located at the center in the vehicle width direction. At the center in the vehicle width direction, these members prevent the obstacle from entering the vehicle interior. The guard panel 20 prevents, on the outer side in the vehicle width direction, the obstacle coming toward a portion of the vehicle body 2 (see FIG. 1) exposed through the front wheel 3 as viewed from the front from entering the vehicle interior.

The guard panel 20 is, for example, in the shape of a metal or resin plate. The outer edge of the guard panel 20 in the vehicle width direction is attached to the first frame 11. The inner edge of the guard panel 20 in the vehicle width direction is attached to the second frame 12. The guard panel 20 includes a pair of guard panels 20 located right and left. In the vehicle 100, the front wheels 3 and the peripheral structure thereof are basically bilaterally symmetrical. That is, the pair of right and left guard panels 20 is also bilaterally symmetrical. Unless otherwise specified, the right guard panel 20 will be described below, and detailed description of the left guard panel 20 will be omitted.

Figure 3:
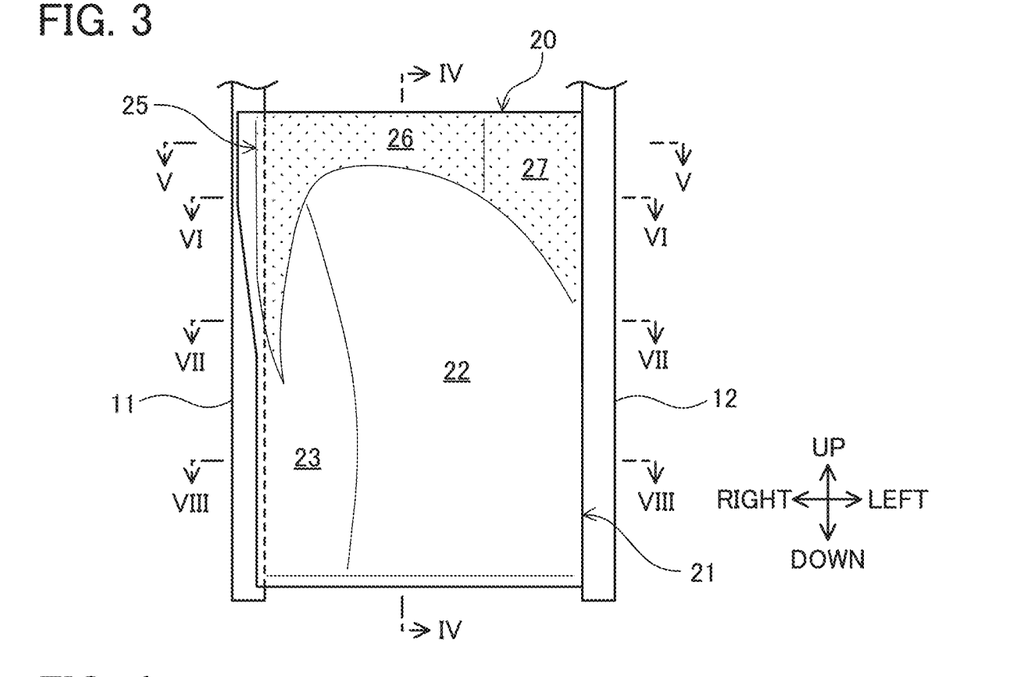
FIG. 3 is a front view of a guard panel, a first frame, and a second frame.

FIG. 3 is a front view of the right guard panel 20, the right first frame 11, and the right second frame 12. The guard panel 20 includes a recessed wall 21 defining a wheel housing 4 (see FIG. 2) that houses the front wheel 3 and an upper wall 25 located above the recessed wall 21. That is, in terms of a position in the up-down direction, the guard panel 20 expands to a position higher than the wheel housing 4. In FIG. 3, the upper wall 25 is dotted for the sake of convenience in description. In this example, the upper wall 25 is integrated with the recessed wall 21.

Figure 4:
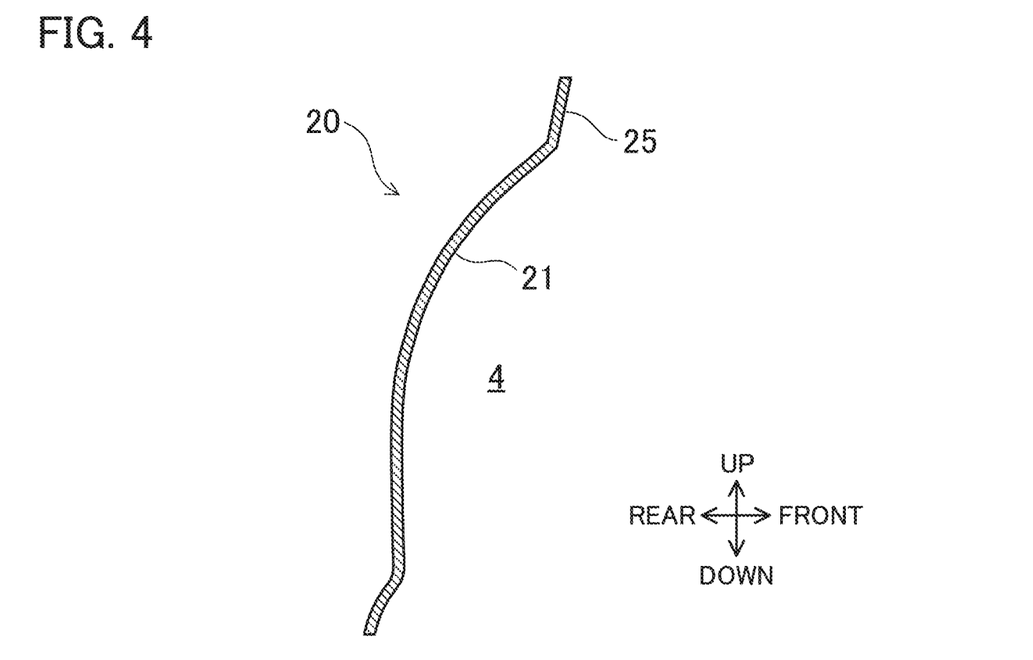
FIG. 4 is a sectional view taken along IV-IV line in FIG. 3.
Figure 5:
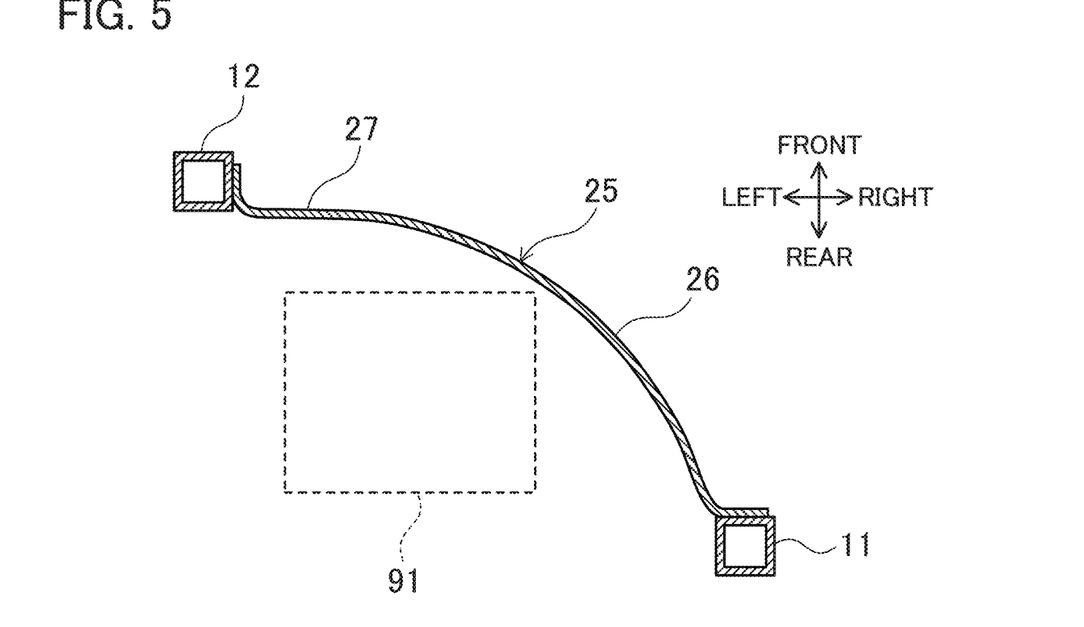
FIG. 5 is a sectional view taken along V-V line in FIG. 3.
Figure 6:
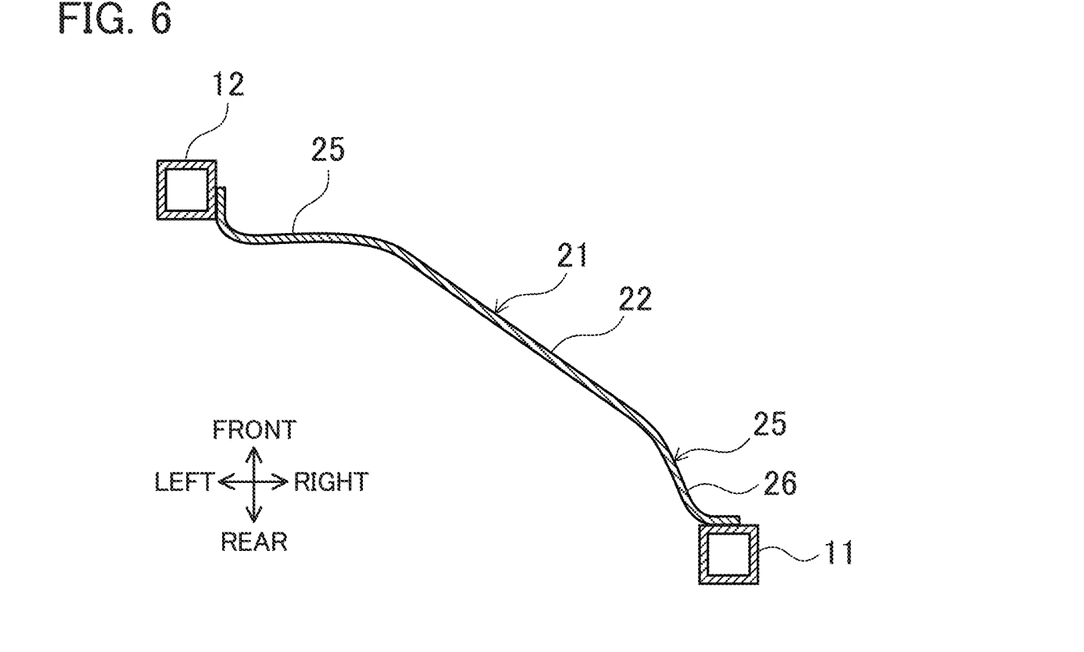
FIG. 6 is a sectional view taken along VI-VI line in FIG. 3.
Figure 7:
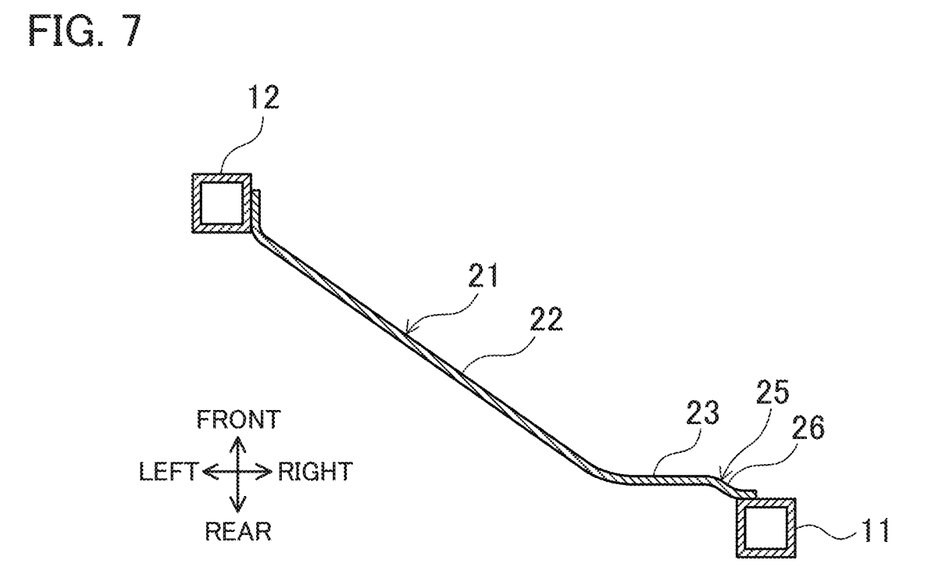
FIG. 7 is a sectional view taken along VII-VII line in FIG. 3.
Figure 8:
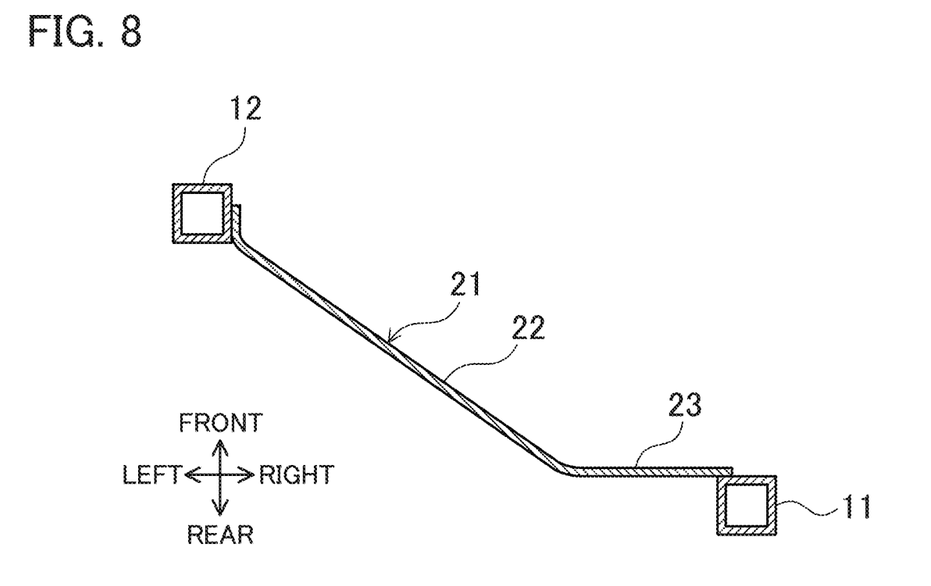
FIG. 8 is a sectional view taken along VIII-VIII line in FIG. 3.

FIG. 4 is a sectional view taken along IV-IV line in FIG. 3. FIG. 5 is a sectional view taken along V-V line in FIG. 3. FIG. 6 is a sectional view taken along VI-VI line in FIG. 3. FIG. 7 is a sectional view taken along VII-VII line in FIG. 3. FIG. 8 is a sectional view taken along VIII-VIII line in FIG. 3.

The recessed wall 21 is recessed to the vehicle interior. That is, the recessed wall 21 is curved so as to be recessed to the vehicle interior. Specifically, as shown in FIG. 6, the recessed wall 21 includes a second inclined wall 22 inclined with respect to the vehicle width direction so as to be positioned on the outer side in the vehicle width direction as extending rearward (also see FIGS. 7 and 8). The "inclination" includes both a case where the second inclined wall 22 is inclined in a linear shape, i.e., a planar shape, and a case where the second inclined wall 22 is inclined in a curved shape. In this example, the second inclined wall 22 is inclined in the planar shape. As shown in FIG. 3, at least a lower portion of the inner edge of the second inclined wall 22 in the vehicle width direction is attached to the second frame 12.

The recessed wall 21 may further include a second front face wall 23 facing the front. The second front face wall 23 is one example of a front face wall. The second front face wall 23 is located on the outer side in the vehicle width direction with respect to the second inclined wall 22. The inner edge of the second front face wall 23 in the vehicle width direction is coupled to the outer edge of the second inclined wall 22 in the vehicle width direction. In this example, the second front face wall 23 is integrated with the second inclined wall 22. In front view, the second front face wall 23 is positioned at rear of the front wheel 3 facing the front-rear direction (i.e., a steering angle is zero), and the second inclined wall 22 is positioned on the inner side in the vehicle width direction with respect to the front wheel 3 facing the front-rear direction. Specifically, the second front face wall 23 overlaps with the front wheel 3 (more specifically, front wheel 3 facing the front-rear direction) in front view.

The upper edge of the second inclined wall 22 and the upper edge of the second front face wall 23 define the upper edge of the recessed wall 21. The upper edge of the recessed wall 21 is coupled to the upper wall 25. The upper edge of the recessed wall 21 is curved so as to protrude upward. The lower edge of the second inclined wall 22 and the lower edge of the second front face wall 23 define the lower edge of the recessed wall 21.

As shown in FIG. 4, the upper wall 25 expands in the up-down direction. As shown in FIG. 5, the upper wall 25 includes a first inclined wall 26 inclined with respect to the vehicle width direction so as to be positioned on the outer side in the vehicle width direction as extending rearward. In this example, the first inclined wall 26 is curved so as to protrude diagonally to the front. For example, a heating, ventilation, and air conditioning (HVAC) 91 etc. are located inside the first inclined wall 26. The upper wall 25 may further include a first front face wall 27 facing the front. The first front face wall 27 is located on the inner side in the vehicle width direction with respect to the first inclined wall 26. The outer edge of the first front face wall 27 in the vehicle width direction is coupled to the inner edge of the first inclined wall 26 in the vehicle width direction. In this example, the first front face wall 27 is integrated with the first inclined wall 26. As shown in FIG. 3, the lower edge of the upper wall 25 is coupled to the upper edge of the recessed wall 21. In this example, the lower edge of the upper wall 25 is curved so as to protrude upward.

Figure 9:
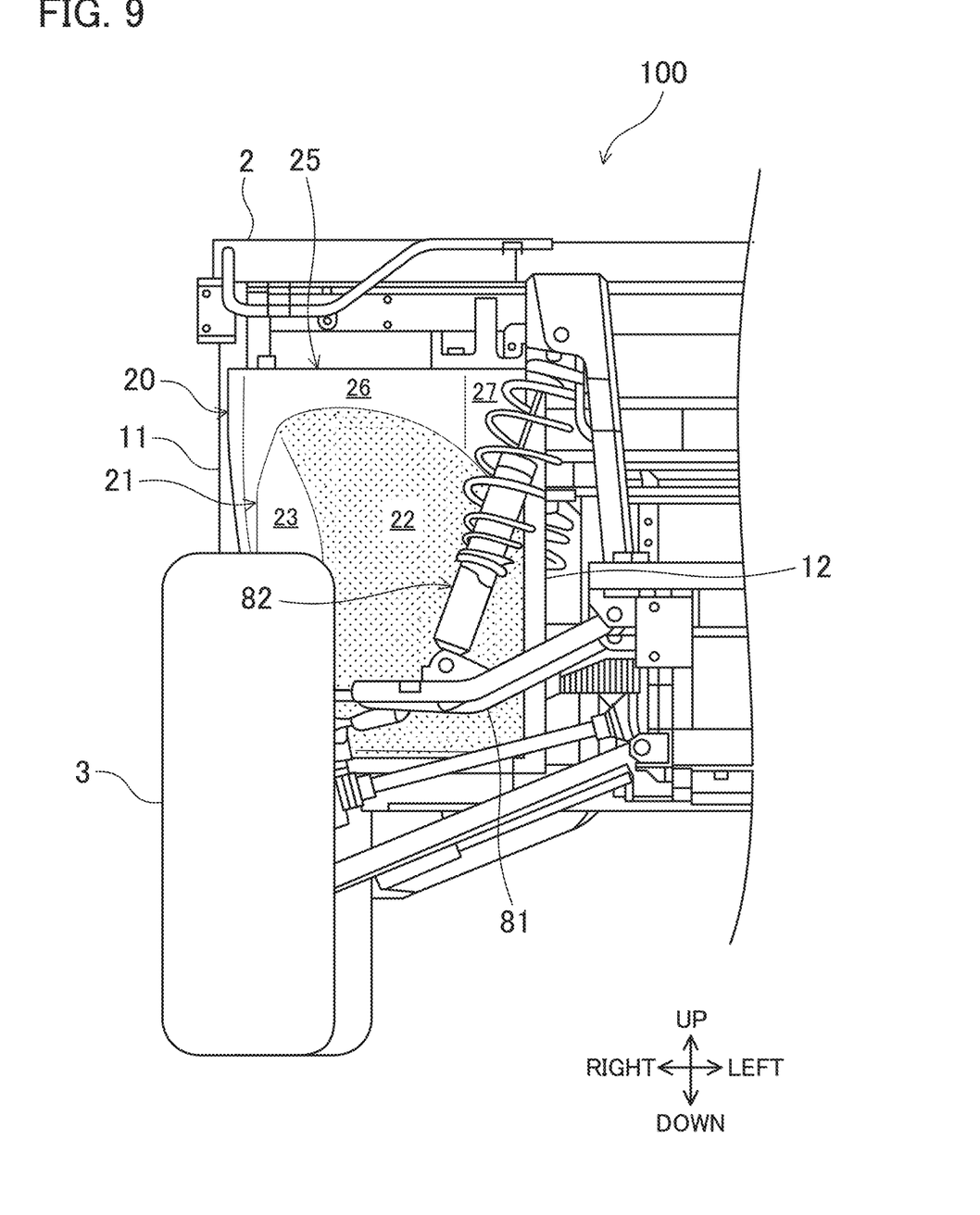
FIG. 9 is a front view of the utility vehicle.

FIG. 9 is a front view of the vehicle 100. In FIG. 9, the second inclined wall 22 is dotted for the sake of convenience in description. As viewed from the front (i.e., in front view), a portion of the recessed wall 21 on the inner side in the vehicle width direction with respect to the front wheel 3 facing the front-rear direction and the outer side in the vehicle width direction with respect to the shock absorber 82 is the second inclined wall 22. That is, as viewed from the front, the portion of the recessed wall 21 on the inner side in the vehicle width direction with respect to the front wheel 3 and the outer side in the vehicle width direction with respect to the shock absorber 82 is inclined with respect to the vehicle width direction so as to be positioned on the outer side in the vehicle width direction as extending rearward. The upper wall 25 is located higher than the front wheel 3. The first inclined wall 26 of the upper wall 25 expands substantially to the outer end of the vehicle body 2 in the vehicle width direction.

In the vehicle 100 described above, the upper wall 25 includes the first inclined wall 26 inclined with respect to the vehicle width direction so as to be positioned on the outer side in the vehicle width direction as extending rearward, and therefore, the obstacle deviates to the outer side in the vehicle width direction in a case where the obstacle has contacted the first inclined wall 26. The obstacle having deviated to the outer side in the vehicle width direction is released to the outside of the vehicle 100. In addition, impact received by the vehicle body 2 from the obstacle can be reduced. This prevents the obstacle from entering the vehicle interior.

In this example, the first inclined wall 26 is curved so as to protrude diagonally to the front, and therefore, entrance of the obstacle into the vehicle interior can be prevented and a space in the vehicle interior can be sufficiently ensured. As shown in FIG. 5, for example, an arrangement space for the HVAC 91 etc. can be sufficiently ensured in the vehicle interior.

The recessed wall 21 includes the second inclined wall 22 inclined with respect to the vehicle width direction so as to be positioned on the outer side in the vehicle width direction as extending rearward, and therefore, the obstacle deviates to the outer side in the vehicle width direction in a case where the obstacle has contacted the second inclined wall 22. The obstacle having deviated to the outer side in the vehicle width direction is released to the outside of the vehicle 100. This further prevents the obstacle from entering the vehicle interior.

Particularly, in this example, the portion of the recessed wall 21 on the inner side in the vehicle width direction with respect to the front wheel 3 and the outer side in the vehicle width direction with respect to the shock absorber 82 as viewed from the front is the second inclined wall 22. In a case where the obstacle moves toward the front wheel 3 or the shock absorber 82, the front wheel 3 or the shock absorber 82 blocks such movement of the obstacle. Thus, the obstacle easily enters a clearance between the front wheel 3 and the shock absorber 82. With the above-described configuration, even in a case where the obstacle has entered the clearance between the front wheel 3 and the shock absorber 82, the obstacle can be deviated to the outer side in the vehicle width direction by the second inclined wall 22. A proper portion of the recessed wall 21 defines the second inclined wall 22 so that entrance of the obstacle into the vehicle interior can be effectively prevented.

Note that the second front face wall 23 is located at rear of the front wheel 3 (specifically, the second front face wall 23 overlaps with the front wheel 3 in front view), and therefore, even in a case where the obstacle moves toward the second front face wall 23, such movement of the obstacle is easily blocked by the front wheel 3. Thus, the obstacle is less likely to contact the second front face wall 23. As a result, in the vehicle 100, even in a case where the recessed wall 21 includes the second front face wall 23, the above-described effect of deviating the obstacle to the outer side in the vehicle width direction is not reduced. Conversely, the recessed wall 21 includes the second front face wall 23, and therefore, the space in the vehicle interior can be increased in size, for example, as compared to a case where the entirety of the recessed wall 21 defines the second inclined wall 22.

Next, vehicles 200, 300, 400 according to first to third modifications will be described. Basic configurations of the vehicles 200, 300, 400 according to the first to third modifications are the same as that of the vehicle 100. Thus, differences from the vehicle 100 will be mainly described.

Figure 10:
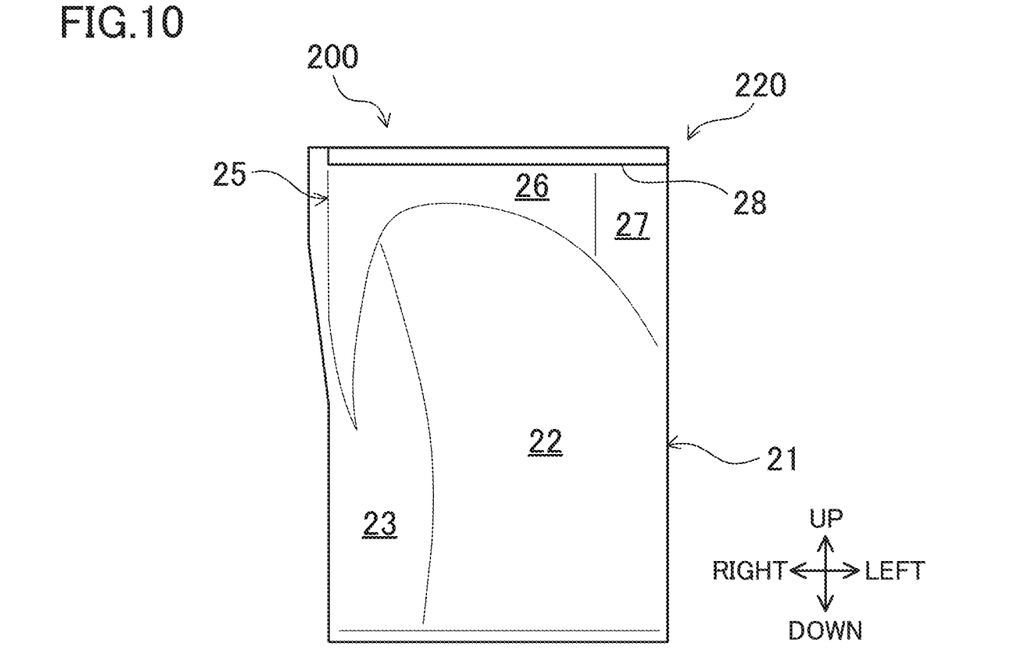
FIG. 10 is a front view of a guard panel according to a first modification.

FIG. 10 is a front view of a guard panel 220 of the vehicle 200 according to the first modification. The vehicle 200 according to the first modification is different from the vehicle 100 in the configuration of the guard panel 220. The guard panel 220 further includes an upper guard 28 located at the upper end of the upper wall 25 and protruding forward from the upper end of the upper wall 25. The upper guard 28 extends along the upper end of the upper wall 25. In this example, the upper guard 28 extends from the inner end of the upper wall 25 in the vehicle width direction to the outer end of the upper wall 25 in the vehicle width direction. The upper guard 28 is made, for example, of metal or resin. The upper guard 28 may be integrated with or separated from a portion of the upper wall 25 other than the upper guard 28. According to the vehicle 200, even in a case where the obstacle having contacted the upper wall 25 changes its direction and moves toward the vehicle interior, such movement of the obstacle can be blocked by the upper guard 28.

Figure 11:
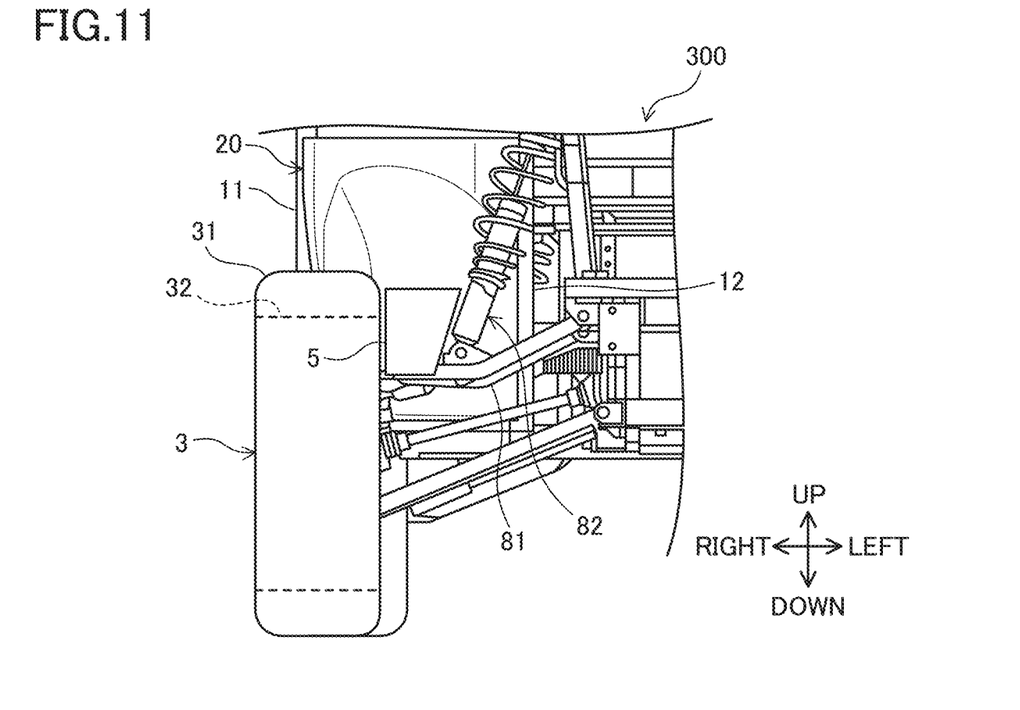
FIG. 11 is a front view of a utility vehicle according to a second modification.

FIG. 11 is a front view of the vehicle 300 according to the second modification. The vehicle 300 is different from the vehicle 100 in that the vehicle 300 has a blocking panel 5. The blocking panel 5 blocks movement of the obstacle which may enter the clearance between the front wheel 3 and the shock absorber 82. The blocking panel 5 is in a plate shape. Specifically, the blocking panel 5 is in a flat plate shape. The blocking panel 5 is made, for example, of metal or resin. The blocking panel 5 is attached to the suspension arm 81 (specifically, an upper arm of the suspension arm 81) such that the thickness direction of the blocking panel 5 and the front-rear direction are substantially parallel with each other or a direction inclined with respect to the front-rear direction and the thickness direction of the blocking panel 5 are substantially parallel with each other. Specifically, the lower edge of the blocking panel 5 is attached to a portion of the suspension arm 81 on the outer side in the vehicle width direction with respect to the shock absorber 82. The shape of the blocking panel 5 as viewed in the thickness direction preferably corresponds to the shape of the clearance between the front wheel 3 and the shock absorber 82. In this example, the shape of the blocking panel 5 as viewed in the thickness direction is a substantially trapezoidal shape. The upper end of the blocking panel 5 is positioned lower than the upper end of a tire 31 of the front wheel 3. Specifically, the upper end of the blocking panel 5 is positioned higher than the upper end of a wheel 32 of the front wheel 3.

According to the vehicle 300, the obstacle is blocked in advance by the blocking panel 5 before reaching the guard panel 20. This further prevents the obstacle from entering the vehicle interior. Particularly, in this example, the upper end of the blocking panel 5 is positioned lower than the upper end of the tire 31 of the front wheel 3. With this configuration, the size of the blocking panel 5 can be minimized, and therefore, entrance of the obstacle into the vehicle interior can be prevented by the blocking panel 5 while detachment of the blocking panel 5 from the suspension arm 81 due to traveling air can be prevented.

Figure 12:
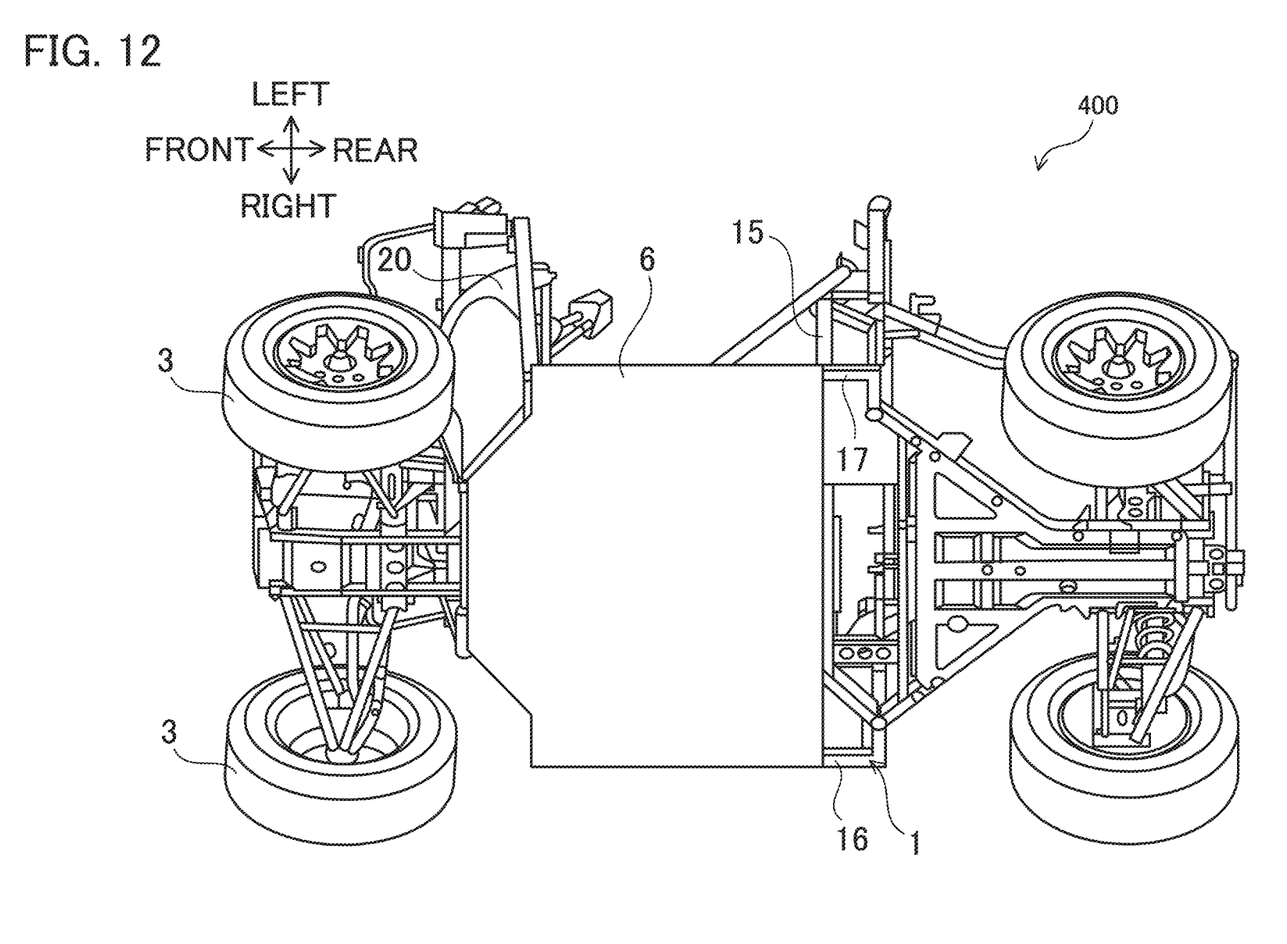
FIG. 12 is a perspective view showing a utility vehicle according to a third modification as viewed from the bottom.

FIG. 12 is a perspective view showing the vehicle 400 according to the third modification as viewed from the bottom. In FIG. 12, an exterior member such as a door is not shown for the sake of convenience in description. The vehicle 400 is different from the vehicle 100 in that the vehicle 400 has a lower guard panel 6. The lower guard panel 6 is in a plate shape. Specifically, the lower guard panel 6 is in a flat plate shape expanding in the front-rear direction and the vehicle width direction. The lower guard panel 6 is located on the bottom of the vehicle 400. Specifically, the lower guard panel 6 is attached to the vehicle body frame 1 at the bottom of the vehicle 400. The lower guard panel 6 covers the vehicle interior (i.e., occupant space) of the vehicle 400 as viewed from below. Specifically, as viewed from below, the lower guard panel 6 expands from the front end to the rear end of the vehicle interior, and expands from the right end to the left end of the vehicle interior in the vehicle width direction. More specifically, as viewed from below, the lower guard panel 6 expands from the inner end of the guard panel 20 in the vehicle width direction to the front end of a seat frame 15 of a rearmost seat, and expands from a right front-rear frame 16 of the vehicle body frame 1 located on the rightmost side and extending in the front-rear direction to a left front-rear frame 17 of the vehicle body frame 1 located on the leftmost side and extending in the front-rear direction. The lower guard panel 6 is made, for example, of metal or resin. According to the vehicle 400, even in a case where the obstacle moves toward the vehicle interior after having passed below the guard panel 20, entrance of the obstacle into the vehicle interior is prevented by the lower guard panel 6. This further prevents the obstacle from entering the vehicle interior.

OTHER EMBODIMENTS

The embodiment has been described above as an example of the technique disclosed in the present application. However, the technique in the present disclosure is not limited to above, and is also applicable to embodiments to which changes, replacements, additions, omissions, etc. are made as necessary. The components described above in the embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

For example, the off-road vehicle is not limited to the utility vehicle 100. The off-road vehicle may be, for example, an all terrain vehicle (ATV) or a tractor. Moreover, the off-road vehicle is not limited to the four-wheeled vehicle, and for example, may be a three-wheeled vehicle.

The guard panel 20 may be in a mesh shape. That is, the guard panel 20 may have minute openings. In this case, the size of each opening is set smaller than the size of the expected obstacle. According to this configuration, the guard panel 20 can be reduced in weight.

The shape of the upper wall 25 is not limited as long as the upper wall 25 includes the first inclined wall 26. The upper wall 25 does not necessarily include the first front face wall 27, and the entirety of the upper wall 25 may be the first inclined wall 26. The shape of the first inclined wall 26 is not limited as long as the first inclined wall 26 is inclined with respect to the vehicle width direction so as to be positioned on the outer side in the vehicle width direction as extending rearward. The first inclined wall 26 is not necessarily curved so as to protrude diagonally to the front. For example, the first inclined wall 26 may be inclined in a planar shape so as to be positioned on the outer side in the vehicle width direction as extending rearward. The upper wall 25 may be separated from the recessed wall 21. The first front face wall 27 may be separated from the first inclined wall 26.

The shape of the recessed wall 21 is not limited as long as the recessed wall 21 defines the wheel housing 4. For example, the recessed wall 21 does not necessarily include the second front face wall 23, and the entirety of the recessed wall 21 may be the second inclined wall 22. The shape of the second inclined wall 22 is not limited as long as the second inclined wall 22 is inclined with respect to the vehicle width direction so as to be positioned on the outer side in the vehicle width direction as extending rearward. For example, the second inclined wall 22 may be curved so as to protrude diagonally to the rear. The portion of the recessed wall 21 on the inner side in the vehicle width direction with respect to the front wheel 3 and the outer side in the vehicle width direction with respect to the shock absorber 82 as viewed from the front is not necessarily the second inclined wall 22. The second front face wall 23 may be separated from the second inclined wall 22.

In the utility vehicle 200 according to the first modification, the upper guard 28 does not necessarily extend from the inner end of the upper wall 25 in the vehicle width direction to the outer end of the upper wall 25 in the vehicle width direction. The upper guard 28 may be located at part of the upper edge of the upper wall 25. In the utility vehicle 300 according to the second modification, the shape of the blocking panel 5 as viewed in the thickness direction is not limited to the substantially trapezoidal shape. For example, the shape of the blocking panel 5 as viewed in the thickness direction may be substantially a rectangular shape. The blocking panel 5 is not necessarily attached to the suspension arm 81. For example, the blocking panel 5 may be attached to a knuckle 35 (see FIG. 2) coupled to the suspension arm 81. With this configuration, the blocking panel 5 rotates along with a change in the steering angle of the front wheel 3, and therefore, contact of the blocking panel 5 with the front wheel 3 when the steering angle of the front wheel 3 is changed is prevented.

In the utility vehicle 400 according to the third modification, the shape of the lower guard panel 6 is not limited as long as the lower guard panel 6 covers the vehicle interior of the vehicle 400 as viewed from below.

[Aspects]

The above-described embodiment is a specific example of the following aspects.

(First Aspect) The utility vehicle 100 (off-road vehicle) includes the vehicle body frame 1 and the guard panel 20, 220 attached to the vehicle body frame 1 and defining the front portion of the vehicle body 2. The guard panel 20, 220 includes the recessed wall 21 defining the wheel housing 4 that houses the front wheel 3 and the upper wall 25 located above the recessed wall 21, and the upper wall 25 includes the first inclined wall 26 inclined with respect to the vehicle width direction so as to be positioned on the outer side in the vehicle width direction as extending rearward.

According to this configuration, the upper wall 25 includes the first inclined wall 26 inclined with respect to the vehicle width direction so as to be positioned on the outer side in the vehicle width direction as extending rearward, and therefore, the obstacle deviates to the outer side in the vehicle width direction in a case where the obstacle has contacted the first inclined wall 26. The obstacle having deviated to the outer side in the vehicle width direction is released to the outside of the vehicle 100. This prevents the obstacle from entering the vehicle interior.

(Second Aspect) In the utility vehicle 100 according to the first aspect, the first inclined wall 26 is curved so as to protrude diagonally to the front.

According to this configuration, entrance of the obstacle into the vehicle interior can be prevented, and the space in the vehicle interior can be sufficiently ensured.

(Third Aspect) In the utility vehicle 100 according to the first or second aspect, the recessed wall 21 includes the second inclined wall 22 inclined with respect to the vehicle width direction so as to be positioned on the outer side in the vehicle width direction as extending rearward.

According to this configuration, the recessed wall 21 includes the second inclined wall 22 inclined with respect to the vehicle width direction so as to be positioned on the outer side in the vehicle width direction as extending rearward, and therefore, the obstacle deviates to the outer side in the vehicle width direction in a case where the obstacle has contacted the second inclined wall 22. The obstacle having deviated to the outer side in the vehicle width direction is released to the outside of the vehicle 100. This further prevents the obstacle from entering the vehicle interior.

(Fourth Aspect) The utility vehicle 100 according to any one of the first to third aspects further includes the suspension arm 81 coupling the vehicle body frame 1 and the front wheel 3 to each other, and the shock absorber 82 located above the suspension arm 81 and attached to the suspension arm 81. The portion of the recessed wall 21 on the inner side in the vehicle width direction with respect to the front wheel 3 and the outer side in the vehicle width direction with respect to the shock absorber 82 as viewed from the front is the second inclined wall 22.

According to this configuration, even in a case where the obstacle has entered the clearance between the front wheel 3 and the shock absorber 82, the obstacle can be deviated to the outer side in the vehicle width direction by the second inclined wall 22. The proper portion of the recessed wall 21 defines the second inclined wall 22 so that entrance of the obstacle into the vehicle interior can be effectively prevented.

(Fifth Aspect) In the utility vehicle 100 according to any one of claims 1 to 4, the recessed wall 21 includes the front face wall (second front face wall 23) facing the front.

According to this configuration, the space in the vehicle interior can be increased in size, for example, as compared to a case where the entirety of the recessed wall 21 is inclined with respect to the vehicle width direction.

(Sixth Aspect) In the utility vehicle 100 according to any one of claims 1 to 5, wherein the front face wall (second front face wall 23) overlaps with the front wheel 3 in front view.

According to this configuration, even in a case where the obstacle moves toward the front face wall of the recessed wall 21, such movement of the obstacle is easily blocked by the front wheel 3. Thus, the obstacle is less likely to contact the front face wall of the recessed wall 21. As a result, even in a case where the recessed wall 21 includes the front face wall, the above-described effect of deviating the obstacle to the outer side in the vehicle width direction is not reduced.

(Seventh Aspect) In the utility vehicle 100 according to any one of claims 1 to 6, the guard panel 220 further includes the upper guard 28 located at the upper end of the upper wall 25 and protruding forward from the upper end of the upper wall 25.

According to this configuration, even in a case where the obstacle having contacted the upper wall 25 changes its direction and moves toward the vehicle interior, such movement of the obstacle can be blocked by the upper guard 28.

What is claimed:
1. An off-road vehicle comprising:
a vehicle body frame; and
a guard panel attached to the vehicle body frame and defining a front portion of a vehicle body,
wherein the guard panel includes a recessed wall defining a wheel housing that houses a front wheel and an upper wall located above the recessed wall, and
the upper wall includes a first inclined wall inclined with respect to a vehicle width direction so as to be positioned on an outer side in the vehicle width direction as extending rearward.
2. The off-road vehicle of claim 1, wherein
the first inclined wall is curved so as to protrude diagonally to a front.
3. The off-road vehicle of claim 1, wherein
the recessed wall includes a second inclined wall inclined with respect to the vehicle width direction so as to be positioned on the outer side in the vehicle width direction as extending rearward.
4. The off-road vehicle of claim 3, further comprising:
a suspension arm coupling the vehicle body frame and the front wheel to each other; and
a shock absorber located above the suspension arm and attached to the suspension arm,
wherein a portion of the recessed wall on an inner side in the vehicle width direction with respect to the front wheel and the outer side in the vehicle width direction with respect to the shock absorber as viewed from the front is the second inclined wall.
5. The off-road vehicle of claim 1, wherein
the recessed wall includes a front face wall facing a front.
6. The off-road vehicle of claim 5, wherein
the front face wall overlaps with the front wheel in front view.
7. The off-road vehicle of claim 1, wherein
the guard panel further includes an upper guard located at an upper end of the upper wall and protruding forward from the upper end of the upper wall.

\* \* \* \* \*